J. H. GOEHST & R. G. CARPENTER.
GEARING.
APPLICATION FILED AUG. 25, 1910.
1,032,666.
Patented July 16, 1912.
3 SHEETS—SHEET 3.
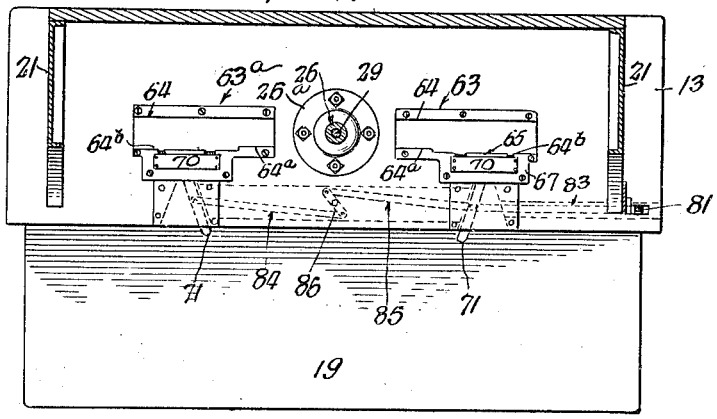
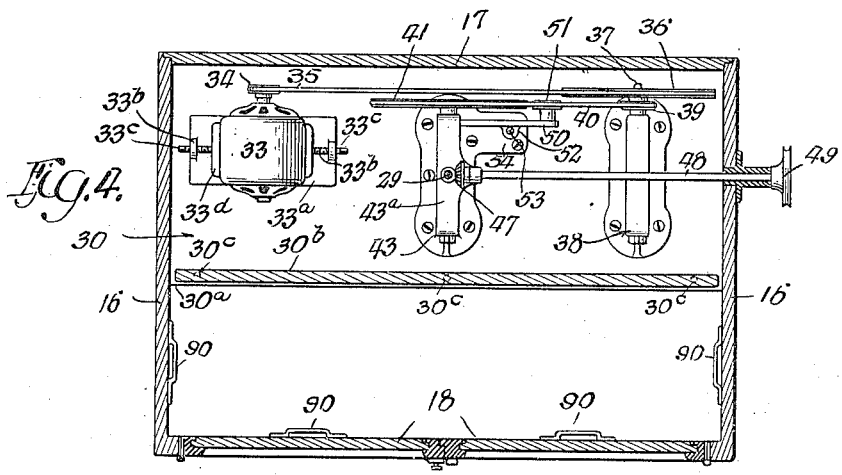
Witnesses:
T. H. Alfreds.
A. R. Wilkins.
Inventors
John H. Goehst
Ralph G. Carpenter
by Poole & Brown Attys

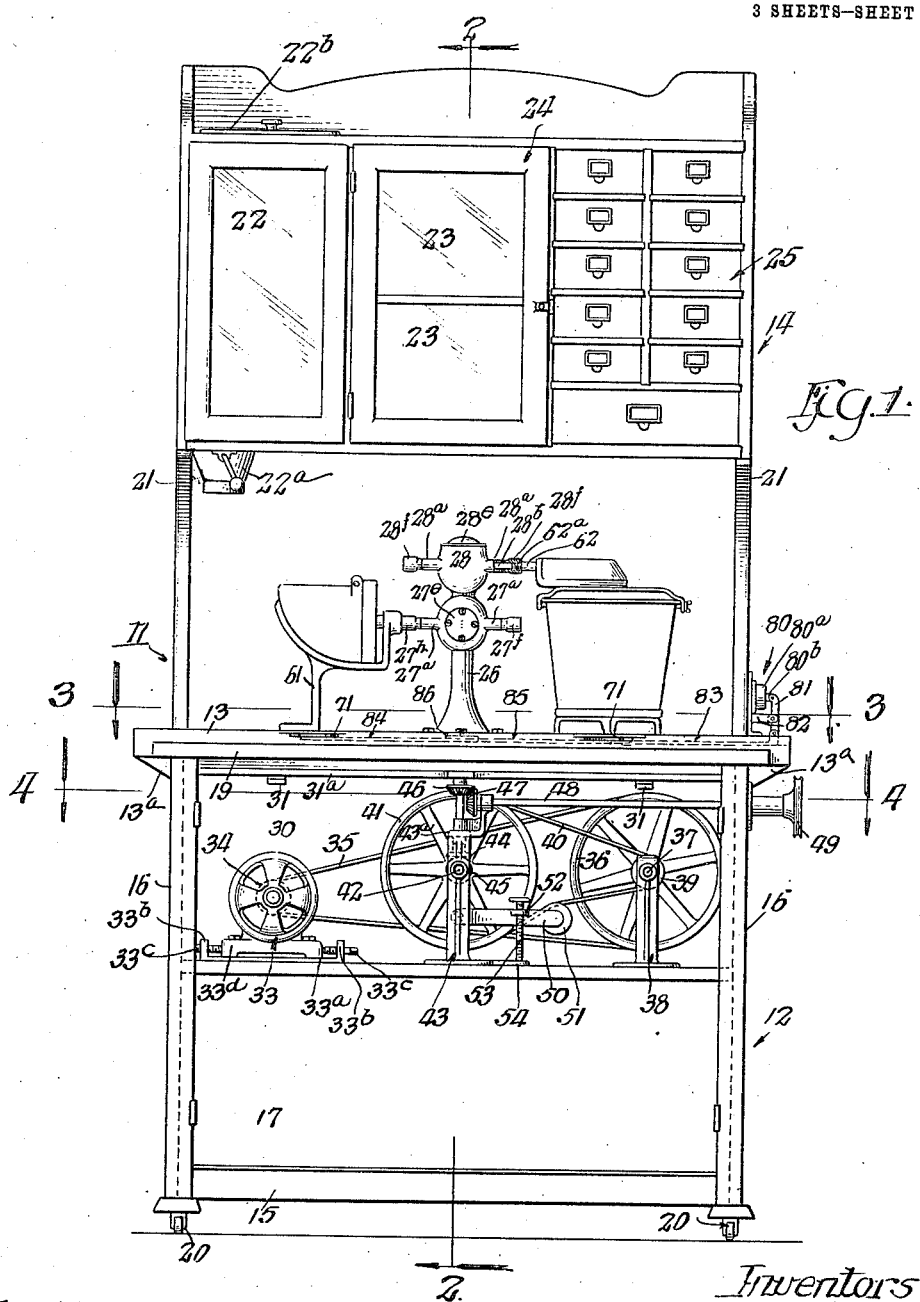

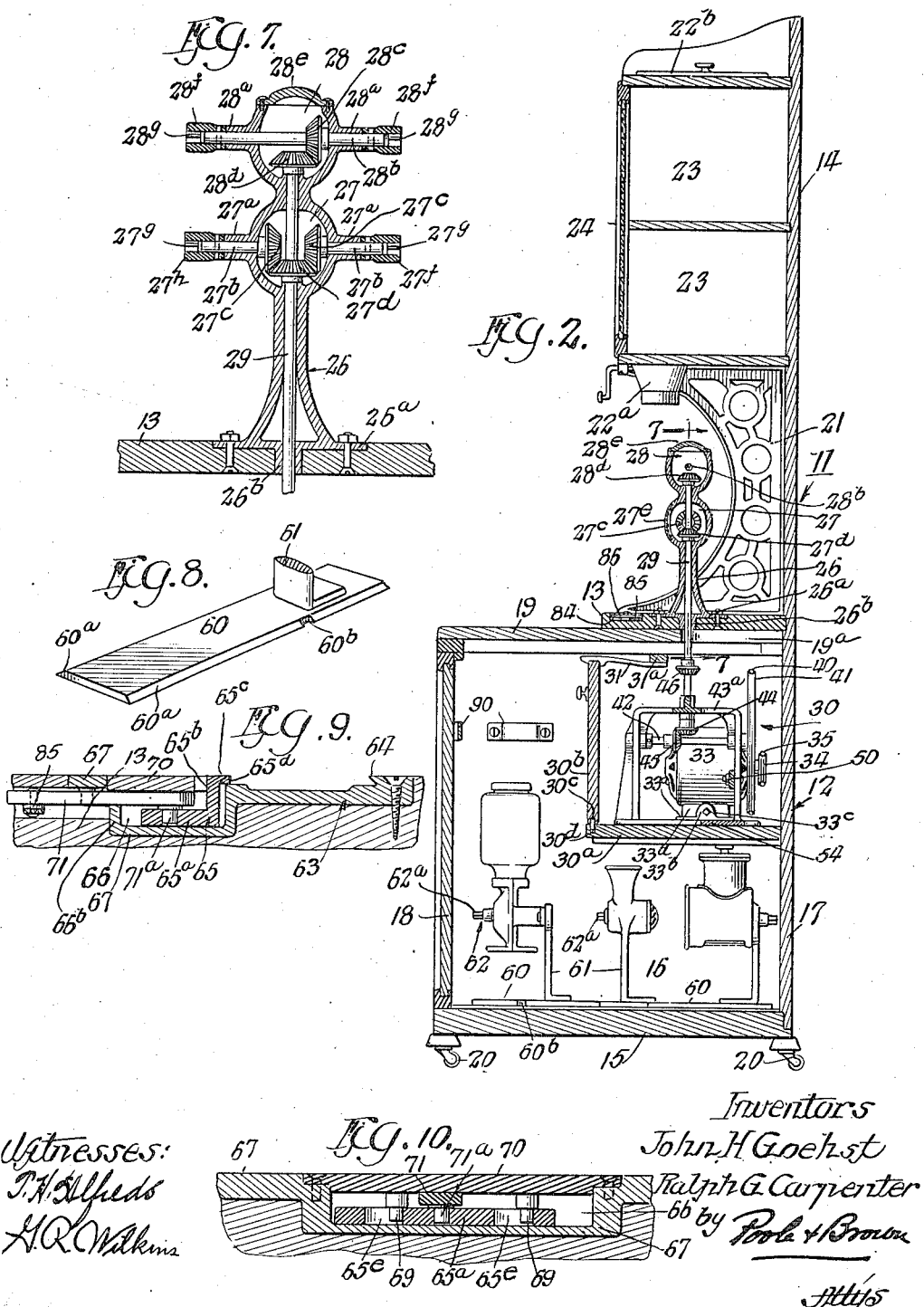

UNITED STATES PATENT OFFICE.

JOHN H. GOEHST AND RALPH G. CARPENTER, OF CHICAGO, ILLINOIS, ASSIGNORS TO FEDERAL ELECTRIC COMPANY, A CORPORATION OF ILLINOIS.

GEARING.

1,032,666.  Specification of Letters Patent.  Patented July 16, 1912.

Application filed August 25, 1910. Serial No. 578,951.

*To all whom it may concern:*

Be it known that we, JOHN H. GOEHST and RALPH G. CARPENTER, citizens of the United States, and residents of Chicago, in the county of Cook and State of Illinois, have invented certain new and useful Improvements in Gearing; and we do hereby declare that the following is a full, clear, and exact description thereof, reference being had to the accompanying drawings, and to the letters of reference marked thereon, which form a part of this specification.

This invention relates to an improved power kitchen cabinet and consists of the matters hereinafter described and more particularly pointed out in the appended claims.

In the drawings:—Figure 1 is a front elevation of the improved power kitchen cabinet. Fig. 2 is a vertical section through Fig. 1 on the line 2—2 thereof. Fig. 3 is a cross-section through Fig. 1 on the line 3—3 thereof. Fig. 4 is a cross-section through Fig. 1 on the line 4—4 thereof. Fig. 5 is a top plan view of the mechanism by means of which the base plate secured to the different utensils is locked in position. Fig. 6 is a similar view indicating the parts in position before the base plate is inserted. Fig. 7 is a partial vertical section through Fig. 2 on the line 7—7 thereof. Fig. 8 is a perspective view of the base plate which forms a part of each utensil. Fig. 9 is a transverse section through Fig. 5 on the line 9—9 thereof. Fig. 10 is a longitudinal section through Fig. 5 on the line 10—10 thereof.

11 indicates the kitchen cabinet as a whole. It consists of a base 12 upon the top of which is supported a power table 13, and of an upper cabinet 14 which is supported above the power table. The power table 13 is of the height of the usual kitchen table and is at a convenient level for handling the utensils on the power table in a manner presently to be described, without stooping or bending over.

The base 12 is inclosed to form a lower cabinet and is provided with a bottom wall 15, side walls 16, 16, a rear wall 17 and hinged doors 18, 18 which form the front wall. The top is covered by a bread board 19 which is slidably supported in any convenient way on the side walls 16, 16. The cabinet is mounted on suitable caster wheels 20, by means of which it may be conveniently moved from place to place. The boards forming the back of the cabinet base are preferably extended upward to inclose the space back of and above the power table 13 and to form the back of the upper cabinet 14. Said upper cabinet is supported on brackets 21 located at each end of the power table. It is provided at one end with an inclosed flour reservoir 22 having a sifter $22^a$ located in its bottom wall and a removable top $22^b$ by means of which the reservoir may be filled with flour; with upper and lower middle compartments 23 inclosed by a front hinged door 24; and on its right hand end, with a stack of drawers 25 for containing spices and the various articles used in cooking.

The power table 13 is supported above the movable bread board 19 by means of brackets $13^a$, $13^a$ which are secured to the upper margins of the side walls 16 of the base. In the end of the power table is mounted a vertical tubular bracket 26 having a flanged base $26^a$ which is bolted to the top of the power table, and on the bottom of said base, an annular boss $26^b$ which projects through an opening in the power table and which is provided with a central bore to form a bearing for the operating shaft. Said vertical bracket is enlarged at its upper end to form gear casings 27, 28, the one above the other, which inclose gears on the operating shaft and the several auxiliary driving shafts as will presently appear. The bracket is bored centrally to provide bearings for a vertically disposed operating shaft 29 which projects downwardly through the bore in the boss $26^b$ and through a longitudinal slot $19^a$ in the bread board 19 into a closed compartment 30 in the lower cabinet in which is located a motor and speed reducing mechanism by means of which said shaft is driven. The slot $19^a$ in the bread board permits said board to be drawn forward or pushed back into place without interfering with said shaft.

The compartment 30 is provided with a bottom $30^a$ consisting of a shelf suitably supported on the sides 16 of the base and with a removable front wall $30^b$. Said front wall is provided on its lower edge with pins $30^c$ adapted to engage in openings $30^d$ near the front margin of the bottom $30^a$; its upper edge is engaged by a spring latch 31 which is secured to a bar 31ª extending between the sides of the base.

33 is a motor supported at one end of the shelf 30ª. Said motor is adjustably bolted to a base plate 33ª provided with vertical end lugs 33ᵇ screw-threaded to receive horizontal adjusting screws 33ᶜ which engage the opposite ends of the base 33ᵈ of the motor. To the motor shaft is keyed a pulley 34 which is connected by a belt 35 to a large pulley 36 located at the opposite end of the shelf 30ª and keyed to a horizontal shaft 37 which is journaled in a bracket 38 bolted to the shelf. To the shaft 37 adjacent the large pulley 36 is also keyed a small pulley 39 which is connected by a belt 40 to a large pulley 41 located intermediate the motor and the pulley 36 and keyed to a horizontal shaft 42 which is journaled in a bracket 43. Said bracket has a cross bar 43ª in which the lower end of the vertical shaft 29 has bearing. A beveled gear 44 is keyed to the shaft 29 below said cross bar in mesh with a beveled gear 45 keyed to the horizontal shaft 42. It will thus be seen that the shaft 29 is driven at a reduced speed from the motor through the pulley 34, the belt 35, the pulley 36, the pulley 39, the belt 40, the pulley 41, the shaft 42 and the beveled gears 44, 45. Above the bracket 43 a beveled gear 46 is keyed to the vertical shaft 29 in mesh with another beveled gear 47 keyed to the inner end of a horizontal shaft 48 which projects laterally through one of the side walls of the base and is there provided with a pulley 49 for driving a washing machine, sewing machine or the like.

The belt 35 is tightened by adjusting the position of the motor by means of screws 33ᶜ. To tighten the belt 40 a vertically swinging arm 50 is hinged to the bracket 43 and is provided with an idle pulley 51, which engages the underside of the lower section of the belt 40. The arm 50 is provided with a lug 52 through which is threaded an adjusting screw 53 which engages at its lower end the projecting base 54 of the bracket 43. It is apparent that by screwing this screw downward, the idle pulley 51 will be raised against the lower section of the belt 40 to take up any slack.

The lateral walls of the gear casings 27, 28 formed in the vertical bracket 26, are extended to form bearings 27ª, 27ª 28ª, 28ª (see Fig. 7). In each of the bearings 27ª are journaled short shafts 27ᵇ which project inwardly toward each other and are provided at their inner ends with beveled gears 27ᶜ meshing with a beveled gear 27ᵈ keyed to the shaft 29. In the bearings 28ª is journaled a shaft 28ᵇ which is provided with a beveled gear 28ᶜ in mesh with a beveled gear 28ᵈ keyed to the upper end of the shaft 29. It will be apparent that the several gears are inclosed, respectively, in the casings 27 and 28. The said casings are provided with removable covers 27ᵉ, 28ᵉ which are attached by means of screws or other similar devices. By removing said covers the several gears may be gotten at for oiling, repairs and the like.

The ends of the shaft 28ᵇ project outwardly beyond their bearings and are provided with rigidly secured socket heads 28ᶠ having square sockets 28ᵍ. The inner ends of said heads engage against the ends of the bearings and thus lock the shaft in position. The shafts 27ᵇ are provided with similar socketed heads 27ᶠ, 27ʰ. It will be apparent that while the socket heads 28ᶠ, 28ᶠ, 27ᶠ all rotate in one direction the head 27ʰ rotates in the opposite direction. These several rotative heads are adapted to drive the operating shafts of rotary driven kitchen utensils, which are held with their shafts in locked engagement within said socket heads by means located on the power table at each side of the vertical bracket 26. The socketed heads are provided at the two levels in order to accommodate utensils having operating shafts at different levels, the sockets at the lower level being for utensils having a low shaft, while those at the upper level are for those utensils such, for example, as dough mixers in which the driving shaft of the utensil is located at a somewhat higher level.

In Fig. 1 there is shown on the left in operative position a rotary fruit cutter having its operating shaft locked in engagement with the head 27ʰ; and on the right a rotary dough mixer having its operating shaft in operative engagement with the socketed head 28ᶠ on the right of the bracket. It will be necessary to describe but one of the utensils, as all have similar parts for operatively connecting them in position on the power table so that they will be driven from one or the other of the above-mentioned socket heads. Each utensil is provided with a base plate 60 above which it is supported by means of a leg or legs. Said base plate has parallel, beveled edges 60ª. 62 indicates the operating shaft of the utensil which is provided with a square head 62ª adapted to fit any one of the socketed heads 27ᶠ, 27ʰ, 28ᶠ. The leg or legs 61 are long enough to raise the driving shaft with its square head 62ª to the level of one or the other set of socket heads. 63, 63ª indicate plates located at each side of the bracket 26 and rigidly secured to the top of the power table. Each of said plates are identical except that they are reversed and the description of one will suffice for both. At the front and rear edges of the plate 63 are formed longitudinally extending overhanging flanges 64, 64ª which are adapted to engage the beveled edges 60ª of the base plate 60. The flange 64 at the rear of the plate extends the full length of the plate, while the flanges 64ª on the front of the plate extends but a short distance from the inner end of said plate, that is to say, the end nearest the bracket 26. (See Figs. 5, 6 and 7.) Said front flange is cut away throughout the rest of the length of the plate to form a vertical shoulder 64ᵇ. The base plate 60 is placed on the plate 63 with its rear beveled edge 60ª under the rear overhanging flange 64 and its front edge in engagement with the vertical shoulder 64ᵇ, as indicated in dotted lines in Fig. 6. It is then pushed toward the bracket 26 to bring its forward beveled edge under the forward overhanging flange 64ª of the plate 63. The following means are provided for locking said base plate in this position: 65 is a horizontally movable angular plate (see Fig. 9) which has a base 65ª slidably mounted in a recess 66 formed in a projection 67 of the plate 63. The rear vertical wall of said recess 66 is in line with the vertical shoulder 64ᵇ on the plate 63. Said angular plate 65 has a vertical member 65ᵇ provided with a horizontal overhanging flange 65ᶜ which is adapted to engage the beveled front edge 60ª of the base 60 and at one point in its length it has a square shoulder or tongue 65ᵈ adapted to engage a notch 60ᵇ formed in the front edge of the base plate 60. After the base plate 60 has been moved into the position last above described with its end toward the bracket 26 engaged under the overhanging flange 64ª, the angular plate 65 is moved rearwardly to bring its overhanging flange 65ᶜ into engagement with the beveled front edge of said base plate and with its square tongue 65ᵈ in locking engagement with the notch 60ᵇ. This locks the base of the utensil in position on the power table and the parts are so constructed and arranged with reference to the operating shaft of the utensil that, when the base plate is locked in position, the squared end of said operating shaft will be engaged within one of the socket heads 28ᶠ, 27ᶠ, 27ᵍ.

The base 65ª of the angular plate 65 is provided with inclined slots 65ᵉ which are engaged by fixed depending pins 69 secured to the underside of a plate 70 which incloses the recess 66. A lever 71 hinged to the underside of the projection 67 of the plate 63 projects through a longitudinal slot in the front wall 66ᵇ of the recess 66 and is provided with a depending pin 71ª which pivotally connects said lever to the base 65ª of the angle plate 65. It is apparent that, when the lever 71 is swung in one direction (for example, in Fig. 6 toward the right,) the angular plate 65 will be moved rearwardly by reason of the engagement of the pin 69 in the slots 65ᵉ, and that when swung in the opposite direction said plate will be moved forwardly. Said plate also has a longitudinal movement in the recess 66 and for this reason the recess is made longer than the base 65ª of said angular plate. These parts are covered by suitable inclosing plates, as indicated in the drawings, so as to prevent the moving parts from being exposed to come into contact with the clothes of the user of the cabinet. The lever 71 projects forwardly beyond the front edge of the power table, as illustrated in Fig. 3.

The motor is operated from a suitable source of electric current supply, the electric connection being omitted, however, in the drawings, as forming no part of the invention. A suitable switch is provided for throwing the motor into circuit with the source of supply and said switch is preferably operated by the following mechanism: 80 indicates a switch of the ordinary plug and socket type, 80ª indicating the socket member and 80ᵇ the plug member (see Fig. 1). The plug member is mounted at the upper end of a lever 81 hinged to a fixed bracket 82 and connected at its lower end to a reciprocable bar 83 which is mounted in a suitable groove or slot in the power table. Said bar 83 is pivotally connected to the locking lever 71 and is operatively connected to the operating lever 71 located on the opposite side of the bracket 26. It is apparent that the operating lever 71 is thrown in one direction to lock the utensil in operative position, while the locking lever 71 is thrown in the opposite direction to lock a utensil in place. The arms 71, 71 are connected by links 84, 85 to the opposite end of a hinged arm 86 by which means the movement of either locking lever 71 or 71ª to lock a utensil in place will throw the bar 83 in the same direction to close or open the switch 80.

Any number of utensils may be supplied with the cabinet and when not in use may be put out of the road in the lower cabinet. They may be placed upon the floor of said lower cabinet and in order to provide room for a greater number of such utensils, it is preferred to secure straps 90 on the inner walls and doors of said cabinet, upon which to hang said utensils by means of their respective base plates. When it is desired to use one of the utensils, as, for example, the bread mixer, it is taken from the lower cabinet and placed with its base in the position, on the plate 63, indicated by the dotted lines in Fig. 6. It is then pushed toward the left to bring the front edge of its base plate under the overhanging flange 64ª and the square head of its shaft into the socket 28ᵍ of the rotary head 28ᶠ. The lever 71 is then swung to the left to lock the base of the utensil in place and to throw the switch which starts the motor. To remove the utensil the operation is reversed.

The various advantages of the power cabinet will be apparent from this description. Room is provided in the upper cabinet for storing the various supplies required in a kitchen while in the lower cabinet may be conveniently stored out of the road the various utensils that may be used from time to time on the power table. The power table itself is out of the road and does not interfere with the usual use to which the board 19 may be put as, for example, when it is used for a bread board, in which case it may be drawn out so as to project beyond the cabinet base, thereby giving plenty of room to work upon it. The motor and speed reducing mechanism is all inclosed within the lower cabinet and the rotating shafts, the various gears, and the means for locking the utensils in place are completely inclosed, so that no danger may result in the use of the power table. There are no exposed moving parts except the rotating socket heads and these have no projecting parts which are apt to catch on a woman's sleeve or other garment or which are apt to catch her fingers. The operating parts are all easy to get at for purposes of repair, adjustment or oiling and after this is done are readily closed again.

We claim as our invention:—

1. In a kitchen power cabinet, the combination with a power table, a vertical driving shaft extending above said power table, a vertical tubular bracket in which said shaft is inclosed, said bracket forming gear casings provided with laterally extended bearings, horizontal shafts located in said bearings, intermeshing gears keyed respectively to said horizontal shafts and to said vertical driving shaft inclosed in said gear casings, and means for operating said driving shaft.

2. In combination with a tubular bracket and a driving shaft having bearing therein, said bracket forming a gear casing, a second bearing formed in the wall of said casing, a driven shaft journaled in said second bearing, said shaft projecting beyond said second bearing, a socket head rigidly secured to the projecting end of said shaft, intermeshing gears secured to the opposite end of said driven shaft and to said driving shaft inclosed within said gear casing, and means for operating said driving shaft.

3. In a power kitchen cabinet, in combination with a power table, a rotative operating shaft supported above said power table and provided at its end with a socket, a utensil having a rotative actuating shaft with one end adapted for locking engagement in said socket, and means for simultaneously locking said utensil in position on said table with its actuating shaft in locked operative engagement within the socket of said operating shaft.

4. In a power cabinet, the combination with a power table, and a rotary shaft supported above said table, a rotatively operated utensil, a motor for driving said rotary shaft, and means for simultaneously starting said motor and for locking said utensil in position on said table in locked operative engagement with said shaft.

5. In a power cabinet, the combination with a power table, a rotative operating shaft supported above said table, a utensil having a rotative actuating shaft, said utensil having a base, a plate secured to said table and having a channel adapted to receive the base of said utensil, the central axis of said channel being parallel to the actuating shaft of said utensil, both of said shafts being provided at their ends with interlocking parts, and means for locking the base of said utensil to said plate when the shaft of the utensil is in interlocking engagement with said operating shaft.

6. In a power kitchen cabinet, the combination with the power table, a rotative operating shaft supported above said table, a rotatively operated utensil adapted to be connected with said operating shaft, said utensil having a base, a plate secured on said table and having a channel in which said base is adapted to be received, means for locking the base of said utensil to said plate, and means for driving said operating shaft.

7. In a power cabinet, the combination with a power table, a utensil having a rotative actuating shaft adapted to be supported thereon, a vertical driving shaft extending above said table, a vertical tubular bracket in which said driving shaft is inclosed, said bracket forming a gear casing provided with a laterally extending bearing, a horizontal shaft located in said bearing and adapted to engage with the actuating shaft of said utensil, intermeshing gears keyed respectively to said horizontal shaft and to said vertical driving shaft inclosed in said gear casing, said utensil having a base, a plate secured to said table located adjacent said tubular bracket, in which said base is adapted to be received, a locking member adapted to engage the base of said utensil and lock the same to said plate when the actuating shaft of said utensil is in locked operative engagement with said horizontal shaft, and means for operating said vertical driving shaft.

8. In a power cabinet, the combination with a power table, a utensil having a rotative actuating shaft adapted to be supported thereon, a vertical driving shaft extending above said table, a vertical tubular bracket in which said driving shaft is inclosed, said bracket forming a gear casing provided with a laterally extending bearing, a horizontal shaft located in said bearing and adapted to engage with the actuating shaft of said utensil, intermeshing gears keyed respectively to said horizontal shaft and to said vertical driving shaft inclosed in said gear casing, said utensil having a base with parallel lateral edges, a plate on said power table located adjacent said tubular bracket in which said base is adapted to be secured, said plate being provided with upwardly extending flanges adapted to engage with the parallel lateral edges of said base, a locking member adapted to engage the base of said utensil and lock the same in said plate when the actuating shaft of said utensil is in locked operative engagement with said horizontal shaft, and means for operating said vertical driving shaft.

In testimony, that we claim the foregoing as our invention we affix our signatures in the presence of two witnesses, this 23rd day of August A. D. 1910.

JOHN H. GOEHST.
RALPH G. CARPENTER.

Witnesses:
G. R. WILKINS,
T. H. ALFREDS.